United States Patent
Patil et al.

(10) Patent No.: US 11,003,620 B2
(45) Date of Patent: May 11, 2021

(54) SYSTOLIC ARRAY OF PIPELINED PROCESSING ENGINES FOR IMPLEMENTING DYNAMIC PROGRAMMING ALGORITHMS

(71) Applicant: Intel Corporation, Santa Clara, CA (US)

(72) Inventors: Saurabh Patil, Bangalore (IN); Srajudheen Makkadayil, Bangalore (IN); Rekha Manjunath, Bangalore (IN); Tarjinder Singh, Bangalore (IN); Vikram Sharma Mailthody, Urbana (CA)

(73) Assignee: Intel Corporation, Santa Clara, CA (US)

( * ) Notice: Subject to any disclaimer, the term of this patent is extended or adjusted under 35 U.S.C. 154(b) by 628 days.

(21) Appl. No.: 15/853,303

(22) Filed: Dec. 22, 2017

(65) Prior Publication Data
US 2019/0197019 A1   Jun. 27, 2019

(51) Int. Cl.
*G06F 15/80*   (2006.01)
*G06F 17/16*   (2006.01)
*G06F 17/11*   (2006.01)

(52) U.S. Cl.
CPC .......... *G06F 15/8046* (2013.01); *G06F 17/11* (2013.01); *G06F 17/16* (2013.01)

(58) Field of Classification Search
None
See application file for complete search history.

(56) References Cited

U.S. PATENT DOCUMENTS

| | | | |
|---|---|---|---|
| 4,698,751 A | 10/1987 | Parvin | |
| 4,845,610 A | 7/1989 | Parvin | |
| 5,138,695 A | 8/1992 | Means et al. | |
| 5,630,154 A | 5/1997 | Bolstad et al. | |
| 5,632,041 A | 5/1997 | Peterson et al. | |
| 5,964,860 A | 10/1999 | Peterson et al. | |
| 6,964,860 B2 | 11/2005 | Abbanat et al. | |
| 8,710,864 B2 | 4/2014 | Dasu et al. | |
| 9,323,782 B2* | 4/2016 | Zhou | G06F 16/50 |
| 9,483,442 B2* | 11/2016 | Maeda | G06F 17/16 |
| 2003/0065813 A1* | 4/2003 | Ruehle | G06F 7/722 |
| | | | 709/238 |

(Continued)

OTHER PUBLICATIONS

Marmolejo-Tejada,J.M. etal., Hardware Implementation of Smith-Waterman Algorithm using a Systolic Architecture, 2014, IEEE, 5th Latin American Symposium on Circuits and Systems, 4 pages. (Year: 2014).*

*Primary Examiner* — Eric Coleman

(57) ABSTRACT

An integrated circuit that is capable of performing sequence alignment via dynamic programming methods is provided. The integrated circuit may include a linear systolic array having series-connected processing engines, each of which has a n-stage deep pipeline. The systolic array may align first and second sequences, wherein the first sequence is divided into multiple segments equal to the internal depth of the pipeline. The systolic array may compute matrix scores for these segments in parallel until the entire sequence matrix score is computed. The internal pipeline structure and a loopback memory within the systolic array are configured to take care of any required data dependencies in the computation of the matrix scores.

20 Claims, 9 Drawing Sheets

(56) References Cited

U.S. PATENT DOCUMENTS

| | | | |
|---|---|---|---|
| 2005/0166034 A1* | 7/2005 | De Oliveira Kastrup Pereira | G06F 15/8046 712/19 |
| 2006/0253752 A1* | 11/2006 | Krishnan | G01R 31/31715 714/724 |
| 2009/0150313 A1 | 6/2009 | Heilper et al. | |
| 2009/0240917 A1* | 9/2009 | Fitton | G06F 7/60 712/36 |
| 2009/0325820 A1* | 12/2009 | Burns | G16B 25/00 506/17 |
| 2011/0264888 A1* | 10/2011 | Dasu | G06F 15/8046 712/15 |
| 2012/0017066 A1* | 1/2012 | Vorbach | G06F 9/3885 712/11 |

\* cited by examiner

RefPos:     1  2  3  4  5  6  7  8  9  10 11 12 13 14 15 16 17 18 19
Reference:  C  C  A  T  A  C  T  G  A  A  C  T  G  A  C  T  A  A  C
Read: ACTAGAATGGCT

FIG. 2A

RefPos:     1  2  3  4  5  6  7     8  9  10 11 12 13 14 15 16 17 18 19
Reference:  C  C  A  T  A  C  T     G  A  A  C  T  G  A  C  T  A  A  C
Read:                   A  C  T  A  G  A  A     T  G  G  C  T

FIG. 2B

POS: 5
CIGAR: 3M1I3M1D5M

FIG. 2C

| CLOCK | PE0 | PE1 | PE2 | PE3 |
|---|---|---|---|---|
| CLK0 | R0C0 | | | |
| CLK1 | | | | |
| CLK2 | R1C0 | R0C1 | | |
| CLK3 | | | | |
| CLK4 | R2C0 | R1C1 | R0C2 | |
| CLK5 | | | | |
| CLK6 | R3C0 | R2C1 | R1C2 | R0C3 |
| CLK7 | | | | |
| CLK8 | R4C0 | R3C1 | R2C2 | R1C3 |
| CLK9 | R0C4 | | | |
| CLK10 | R5C0 | R4C1 | R3C2 | R2C3 |
| CLK11 | R1C4 | R0C5 | | |
| CLK12 | R6C0 | R5C1 | R4C2 | R3C3 |
| CLK13 | R2C4 | R1C5 | R0C6 | |
| CLK14 | R7C0 | R6C1 | R5C2 | R4C3 |
| CLK15 | R3C4 | R2C5 | R1C6 | R0C7 |
| CLK16 | R8C0 | R7C1 | R6C2 | R5C3 |
| CLK17 | R4C4 | R3C5 | R2C6 | R1C7 |
| CLK18 | R9C0 | R8C1 | R7C2 | R6C3 |
| CLK19 | R5C4 | R4C5 | R3C6 | R2C7 |
| CLK20 | R0C8 | R9C1 | R8C2 | R7C3 |
| CLK21 | R6C4 | R5C5 | R4C6 | R3C7 |
| CLK22 | R1C8 | R0C9 | R9C2 | R8C3 |
| CLK23 | R7C4 | R6C5 | R5C6 | R4C7 |
| CLK24 | R2C8 | R1C9 | R0C10 | R9C3 |
| CLK25 | R8C4 | R7C5 | R6C6 | R5C7 |
| CLK26 | R3C8 | R2C9 | R1C10 | R0C11 |
| CLK27 | R9C4 | R8C5 | R7C6 | R6C7 |
| CLK28 | R4C8 | R3C9 | R2C10 | R1C11 |

SYSTOLIC ARRAY OF PIPELINED PROCESSING ENGINES FOR IMPLEMENTING DYNAMIC PROGRAMMING ALGORITHMS

BACKGROUND

This relates to integrated circuits and, more particularly, to integrated circuits that is capable of performing sequence alignment.

Sequence alignment is a way of arranging two sequences to identify regions of similarity and is commonly used in applications such as bioinformatics, natural language processing, computer stereo vision, etc. Sequence alignment algorithms generate a substitution matrix to assist in determining areas of similarities. Various algorithms such as the Needleman-Wunsch algorithm and the Smith-Waterman algorithm use dynamic programming methods to calculate the substitution matrix.

Dynamic programming methods typically require constructing a two-dimensional substitution matrix from the two sequences (i.e., first and second sequences) being aligned. In particular, each symbol of the first sequence is compared against each symbol of the second sequence. As the comparison proceeds sequentially, each cell of the substation matrix is filled. Conventional dynamic programming methods are computationally expensive in terms of latency and memory accesses and has a Big-O complexity of $O(n^2)$, where n is the sequence length.

It is within this context that the embodiments described herein arise.

BRIEF DESCRIPTION OF THE DRAWINGS

FIGS. 2A-2C are diagrams illustrating a local sequence alignment in accordance with an embodiment.

FIG. 9 is a table illustrating how the substitution matrix of FIG. 7 can be filled over time in accordance with an embodiment.

DETAILED DESCRIPTION

The present embodiments relate to an integrated circuit that includes a linear systolic array with multiple processing engines coupled in series. The systolic array may be configured to perform alignment of first and second sequences, sometimes referred to collectively as a sequence pair. Instead of computing multiple sequence pairs in parallel, the input data from a single sequence pair may be mapped to a fixed size systolic array.

Each processing engine in the systolic array may have an internal n-stage pipeline depth. The input sequence may be divided into a number of segments or slices that is equal to the internal pipeline depth (e.g., depth of at least two, at least four, at least six, eight or more, etc.). The term "segments" and "slices" can sometimes be used interchangeably when referring to portions of the substitution matrix. The systolic array may compute a matrix score for each of these slices in parallel (e.g., in even and odd cycles) for as many iterations as needed until all of the sequence matrix scores have been computed. Each iteration may include n segments or slices. This scheme is sometimes referred to as iteration-based interleaving.

It will be recognized by one skilled in the art, that the present exemplary embodiments may be practiced without some or all of these specific details. In other instances, well-known operations have not been described in detail in order not to unnecessarily obscure the present embodiments.

Figure 1:
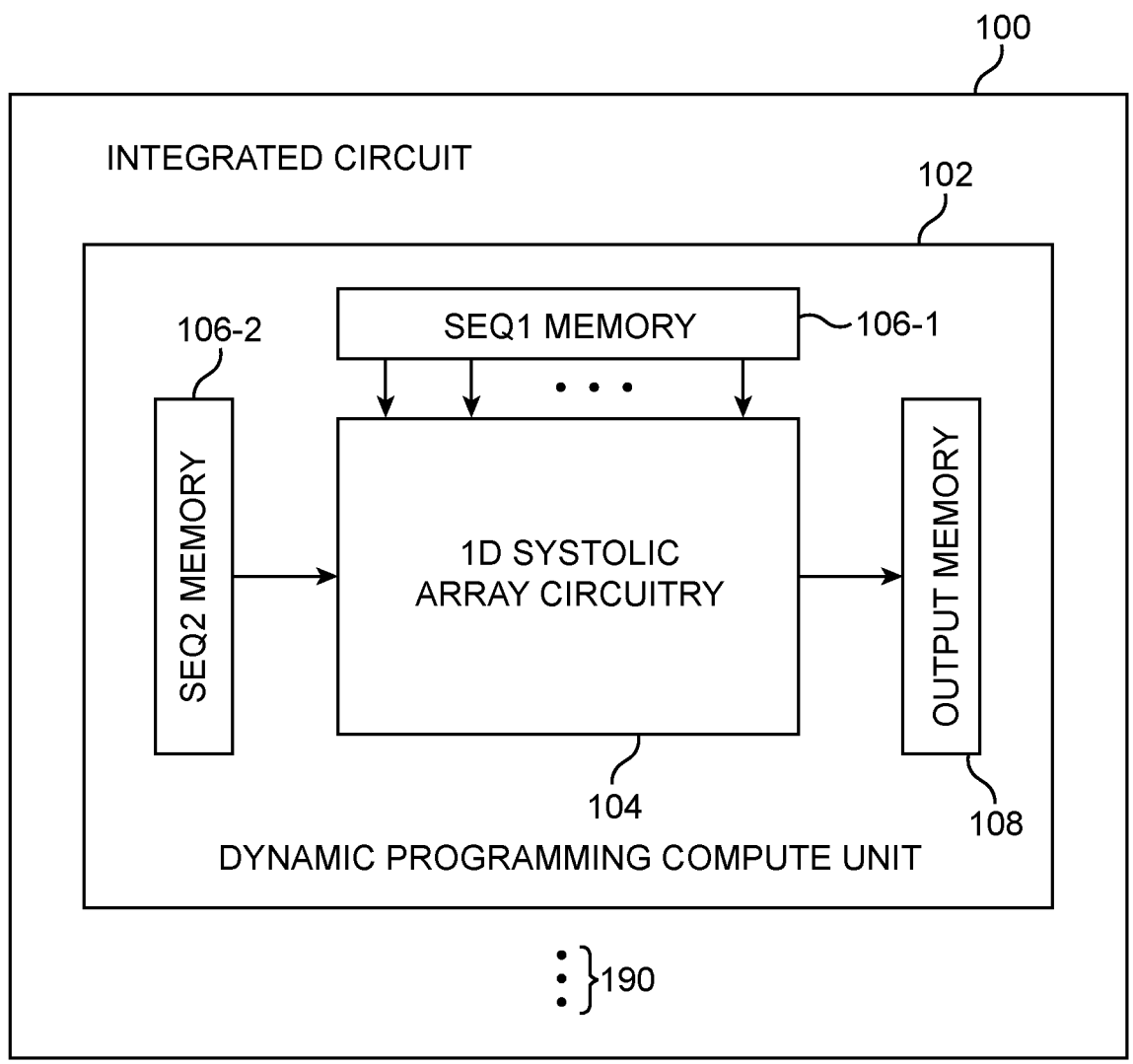
FIG. 1 is a diagram of an illustrative integrated circuit that includes a dynamic programming compute unit with one-dimensional systolic array circuitry in accordance with an embodiment.

FIG. 1 is a diagram of an illustrative integrated circuit such as integrated circuit device 100 that includes dynamic programming compute unit 102. Dynamic programming compute unit 102 may be configured to perform a dynamic programming process that solves an optimization problem by computing and saving optimal scores for the solution to every sub-problem. Dynamic programming may include two phases: a forward phase and a backward phase. In the forward phase (sometimes referred to as the compute phase), the optimal score for each sub-problem is computed. In the backward phase (sometimes referred to as the trace-back phase), the final solution is reconstructed that yields the optimal cost. Dynamic programming methods may be used to perform sequence alignment by identifying regions of similarity. Sequence alignment operations can be used in applications such as bioinformatics, natural language processing, and computer stereo vision, just to name a few.

As shown in FIG. 1, dynamic programming compute unit 102 may include one-dimensional (1D) systolic array circuitry 104, a first sequence memory circuit 106-1 coupled to array circuitry 104, a second sequence memory circuit 106-2 coupled to array circuitry 104, and an output memory circuit 108 that is also coupled to array circuitry 104. First sequence memory 106-1 may feed a first sequence to array circuitry 104 over parallel data paths, whereas second sequence memory 106-2 may feed a second sequence to array circuitry 104 over a serial data path. The first and second sequences may be referred to as a "sequence pair." Systolic array circuitry 104 may compute a substitution matrix to help locally align the sequence pair and may output corresponding scores to output memory 108. Dynamic programming compute unit 102 may align one sequence pair at a time. If desired, additional dynamic programming compute units may be included to compare multiple sequence pairs in parallel (as indicated by ellipsis 190).

FIGS. 2A-2C are diagrams illustrating a local sequence alignment. As shown in FIG. 2A, a first reference sequence includes a first string "CCATACTGAACTGACTAAC," whereas a second read sequence includes a second string "ACTAGAATGGCT." A dynamic programming process may be used to align the read sequence to the reference sequence.

FIG. 2B shows how the two sequences may be aligned with respect to one another. As shown in FIG. 2B, the read sequence begins to align to the reference sequence starting at reference index position 5. The read sequence has a character "A" that is missing from the reference sequence between indices 7 and 8. The reference sequence has a character "C" at index position 11 that is missing from the read sequence.

FIG. 2C shows a numerical encoding (sometimes referred to as a CIGAR string in the context of a Smith-Waterman alignment) that can be used to indicate the position and amount of match/mismatch between the reference sequence and the read sequence and whether there are insertions or deletions relative to the reference sequence. In this example, alignment begins at reference index position 5, followed by three consecutive matches (3M), a single insertion (1I), three more matches (3M), a single deletion (1D), and another five consecutive matches (5M). Thus, the final CIGAR string is 3M1I3M1D5M.

Figure 3A:
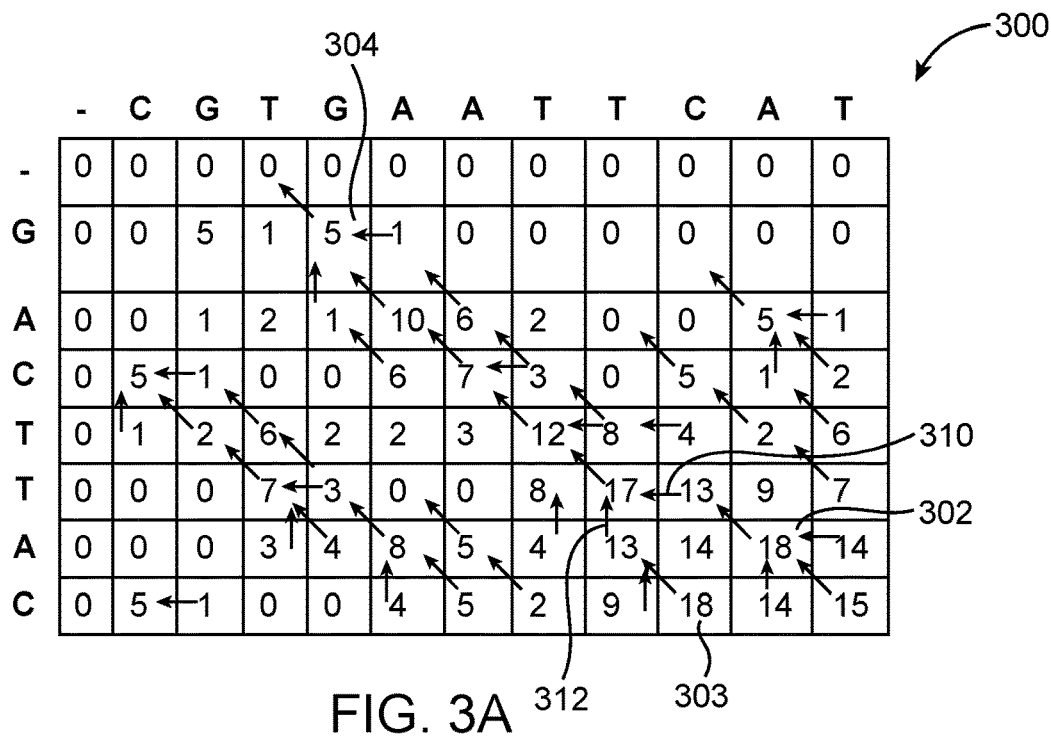
FIGS. 3A-3C are diagrams illustrating the Smith-Waterman algorithm in accordance with an embodiment.
Figure 3B:
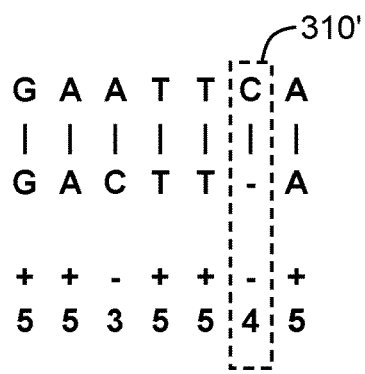
Figure 3C:
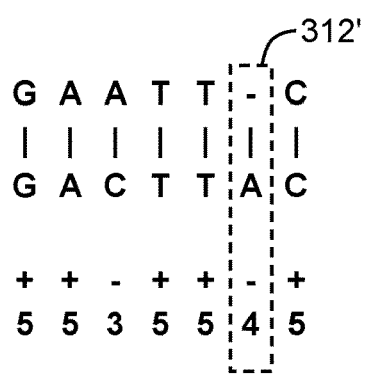

FIGS. 3A-3C illustrates how the Smith-Waterman algorithm can be used to perform local sequence alignment. FIG. 3A shows a substitution matrix 300. Substitution matrix 300 may be at least an m-by-n matrix, where m is the length of the first sequence and n is the length of the second sequence. In one arrangement, the first sequence may be the reference sequence while the second sequence is the read sequence.

As shown in FIG. 3A, the first sequence may be "CGT-GAATTCAT," and the second sequence may be "GACT-TAC." The Smith-Waterman algorithm may compute a matrix value for each cell in matrix 300 according to the following scoring methodology:

$$M_{i,j} = \mathrm{Max}[(M_{i-1,j-1}+S_{i,j}),(M_{i,j-1}+W),(M_{i-1,j}+W),0] \quad (1)$$

where $M_{i,j}$ is the matrix value of the current cell, where $M_{i-1,j-1}$ is the matrix value of cell one row above and one column to the left of the current cell, where $M_{i,j-1}$ the matrix value of the cell one column to the left of the current cell, and where is the matrix value of the cell one row above the current cell. Variable $S_{i,j}$ may represent the score of the current cell, which is equal to +5 if there is a match or −3 if there is a mismatch. Variable W may represent the gap alignment, which is equal to −4 if there is at least one insertion or one deletion along the current path of comparison. The final value of zero in equation 1 ensures that the matrix value is at least equal to 0 and cannot equal a negative number.

The matrix value for each cell in matrix 300 can be computed using equation 1. The complete substitution matrix 300 with computed matrix values is shown in FIG. 3A. In the example of FIG. 3A, there are two cells with the maximum value of 18: cell 302 and cell 303.

FIG. 3B shows the alignment between the two sequences when traced-back from cell 302. As shown in FIG. 3B, there is a deletion 310', which corresponds to the horizontal arrow 310 in FIG. 3A. Matches will follow the diagonal path towards the upper left corner of matrix 300.

FIG. 3C shows the alignment between the two sequences when traced-back from cell 303. As shown in FIG. 3C, there is an insertion [312'], which corresponds to the vertical arrow 312 in FIG. 3A. Matches will similarly follow the diagonal path towards the upper left corner of matrix 300.

Note that both alignments end up at cell 304, which indicates the start of alignment. Both alignment results are equally viable since the maximum matrix value for both paths are identical. This example of using the Smith-Waterman method to align a sequence pair is merely illustrative and is not intended to limit the scope of the present embodiments. Another exemplary dynamic programming algorithm that can be implemented is the Needleman-Wunsch algorithm. In general, sequence alignment operations for arrange two sequences to identify regions of similarity may be used in a variety of applications such as bioinformatics, natural language processing, computer stereo vision, etc. If desired, other suitable operations, processes, and algorithms for performing dynamic programming methods having dependencies on neighboring cells can also be implemented for generating a substitution matrix.

Figure 4:
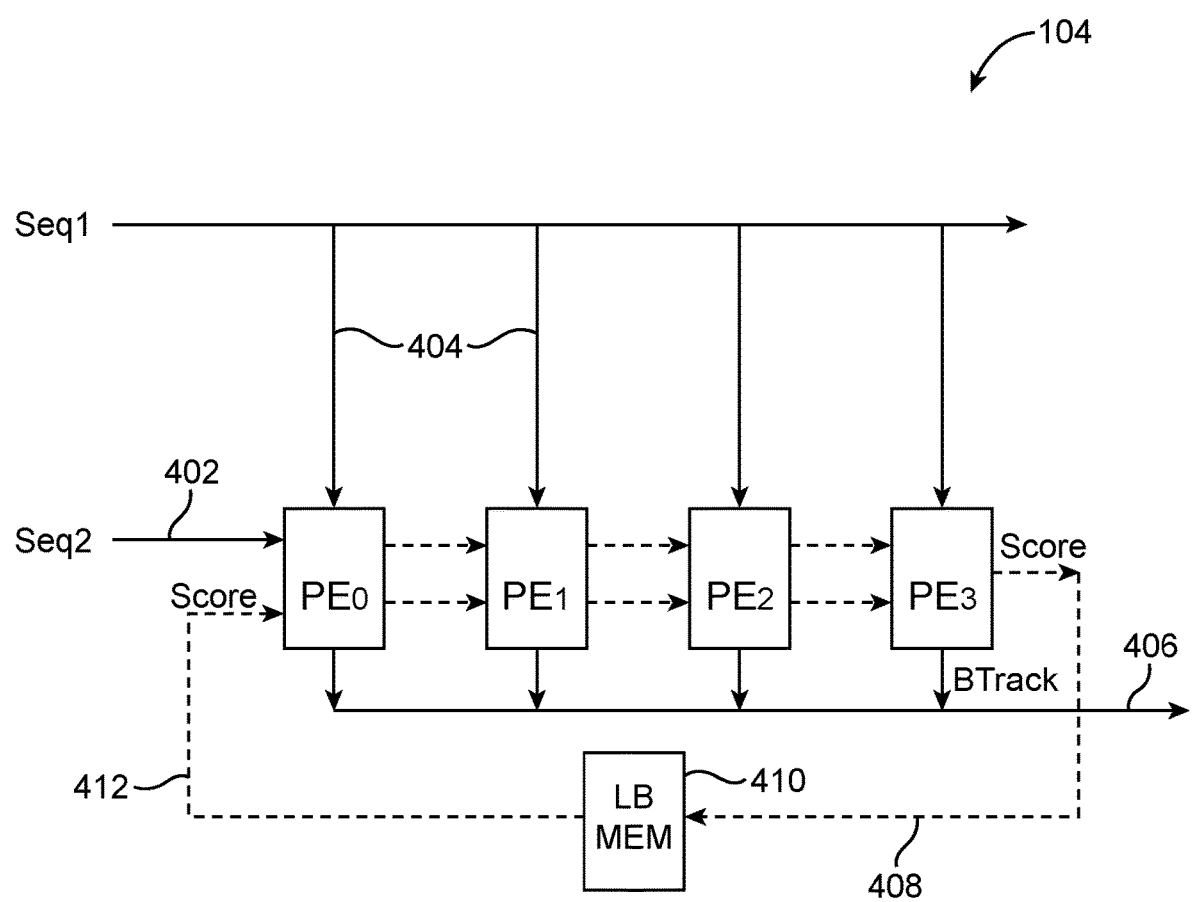
FIG. 4 is a diagram of illustrative one-dimensional systolic array circuitry of processing engines in accordance with an embodiment.

FIG. 4 is a diagram of illustrative one-dimensional systolic array circuitry 104 of processing engines. As shown in FIG. 4, array circuitry 104 may include multiple processing engines PE coupled in series (in a chain) to form a 1D or linear systolic array. In the example of FIG. 4, only four processing engines PE0-PE3 are shown, but the techniques described herein may be extended to a systolic array with any number of processing engines.

A first sequence Seq1 may be received from a first sequence memory (see memory 106-1 in FIG. 1) via parallel data paths 404. A second sequence Seq2 may be received from a second sequence memory (see memory 106-2 in FIG. 1) via serial data path 402. The processing engines may output backtracking data to an output memory (see memory 108 in FIG. 1) via path 406. The score from processing engine PE3 may be selectively fed back as an input to processing engine PE0 via feedback path 408. A loopback memory 410 may be interposed in feedback path 408. Loopback memory 410 may have an output that is coupled to the input of processing engine PE0 via path 412.

To compare the symbols between Seq1 and Seq2, the symbols of Seq2 are fed serially while the symbols of Seq1 are applied in parallel to the processing engines. The various processing engines are enabled as each symbol of Seq2 proceeds serially through the systolic array. For example, in the first cycle, only PE0 is active. In the second cycle, the first two processing engines PE0 and PE1 are enabled. In the third cycle, the first three processing engines PE0-PE2 are enabled, and so on. Once any processing engine is enabled, it stays operational until all the symbols of the sequence propagate serially through it. As each symbol of Seq2 gets compared to the symbol of Seq1, cells of the substitution matrix get computed in a diagonal manner (e.g., in the first cycle, cell(0,0) of the matrix is computed; in the second cycle, cell(0,1) and (1,0) get computed; and so on). This process is illustrated in FIG. 5.

Arranged in this way, each processing engine is configured to perform a sequence alignment operation in accordance with a given dynamic programming algorithm (e.g., the Smith-Waterman algorithm, Needleman-Wunsch algorithm, etc.). In particular, the processing engine may include a comparison circuit for checking whether the symbol from Seq1 matches the symbol from Seq2 and a corresponding match or mismatch score is generated. The processing engine may then compare this value against the value generated by the left, top, and top-left neighboring cells in the substitution matrix to determine the maximum score in accordance with equation 1. The backtrack score of each cell of the substitution matrix is generated based on the output of comparisons among the neighboring cell elements.

Figure 5:
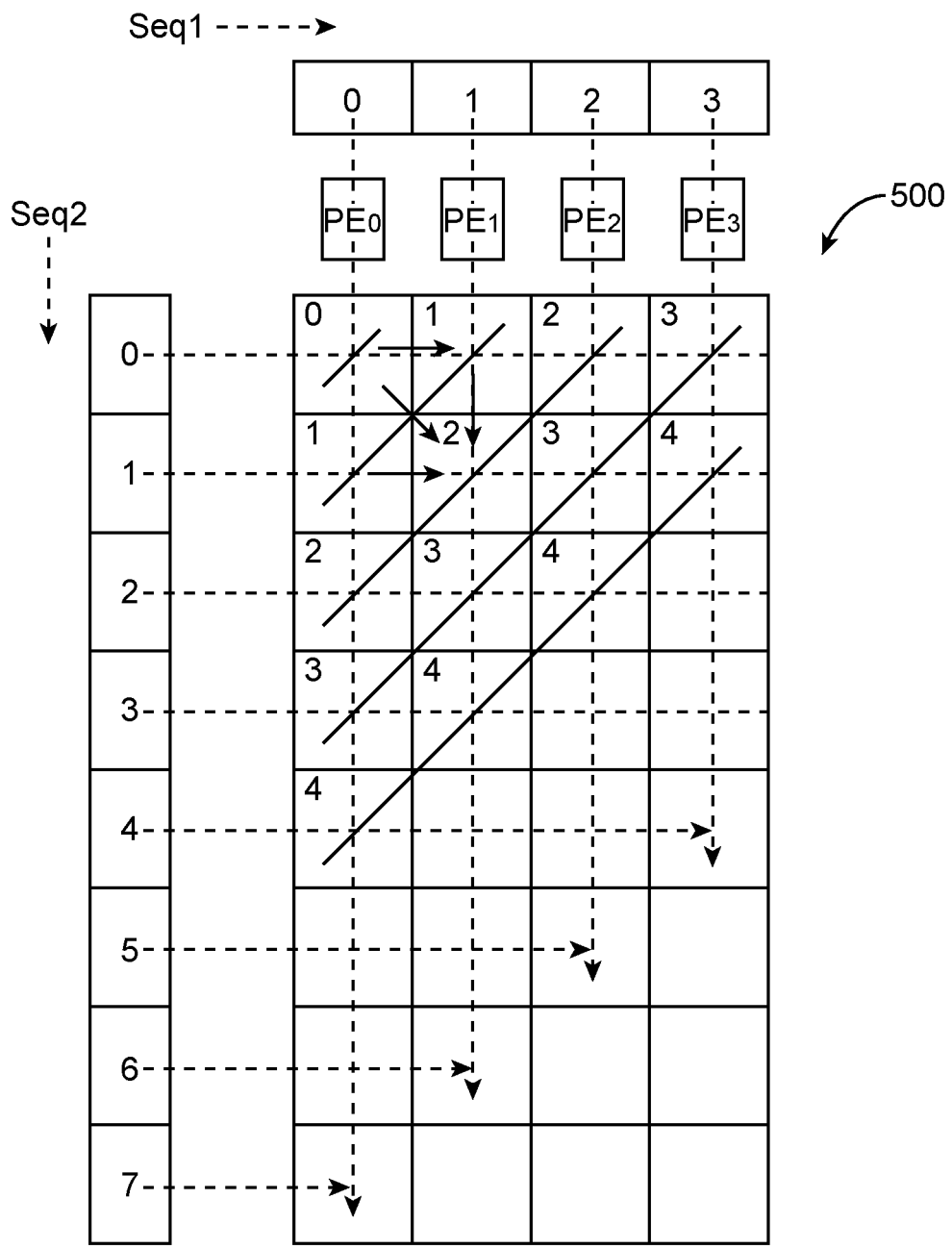
FIG. 5 is a diagram of an illustrative substitution matrix that can be created using systolic array circuitry of the type shown in FIG. 4 in accordance with an embodiment.

FIG. 5 is a diagram of an illustrative substitution matrix 500 that can be created using systolic array circuitry 104 of the type shown in FIG. 4. The numbers in each cell of matrix 500 represents the clock cycle in which that particular cell is computed. As shown in FIG. 5, in clock cycle 0—only processing engine PE0 is active; in clock cycle 1—only processing engines PE0 and PE1 are active; in clock cycle 2—only processing engines PE0, PE1, and PE2 are active; and starting in clock cycle 3—all four processing engines are active.

Hence, the matrix computation moves in a diagonal fashion. The arrows in FIG. 5 between the matrix cells represents the data dependency for the cell computation. For example, cell(0,1) may only depend from cell(0,0). Similarly, cell(1,0) may only depend from cell(0,0). However, cell(1,1) may depend on cell(0,0), cell(1,0), and cell(0,1), which is consistent with equation 1. In other words, most of the cell computation may depend on the results of the left, top, and top-left cells (i.e., cells belonging to the previous diagonal). There is, however, no data dependencies within the cells along the same diagonal, which allows for sequence segmentation. Thus, loopback memory 410 may be used to resolve any data dependencies among different segments, and the depth of loopback memory 410 may be calculated according to the maximum supported length of Seq2 and the size of the processing engines (i.e., the number of processing engines in the systolic array).

Figure 6:
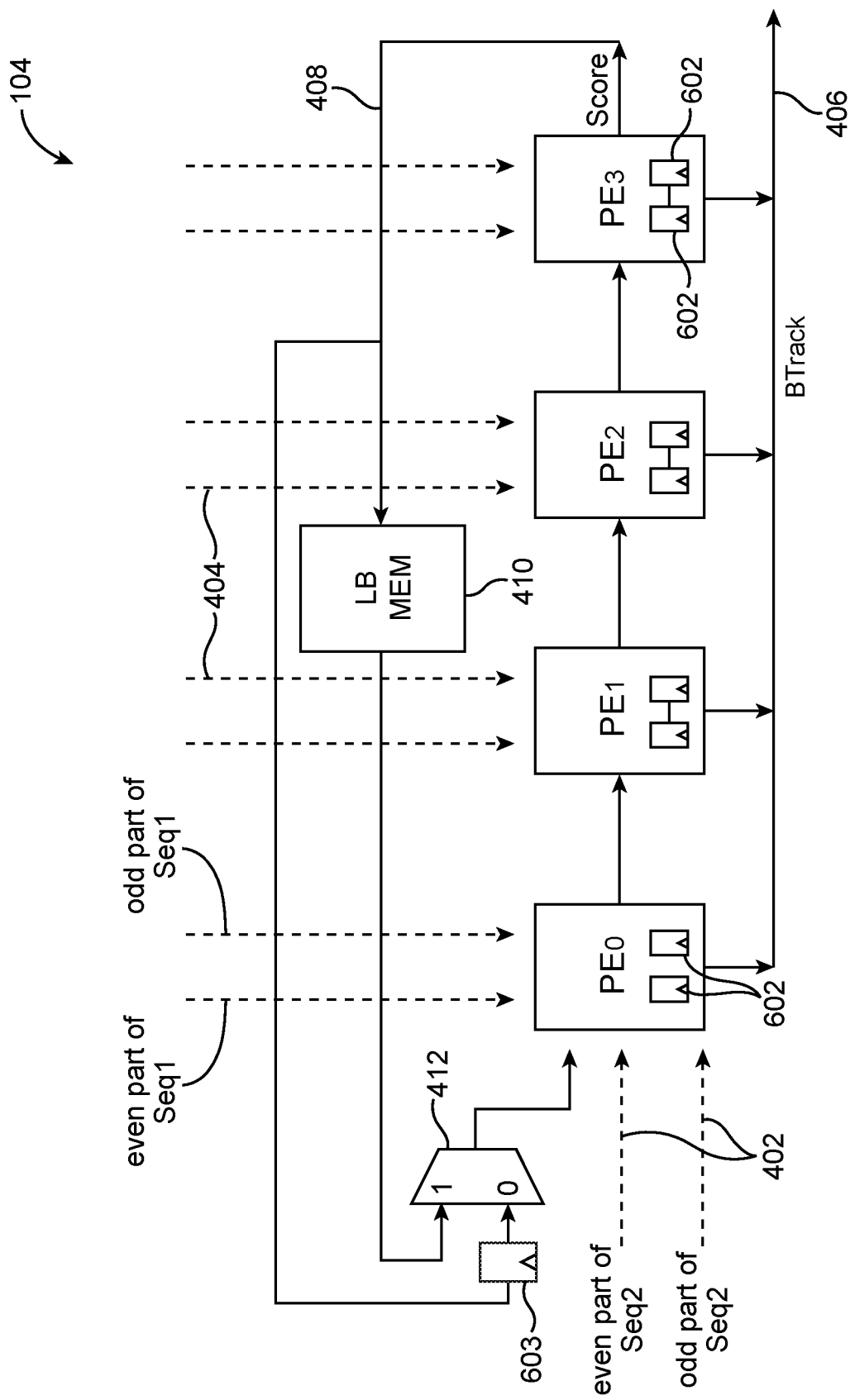
FIG. 6 is a diagram of illustrative one-dimensional systolic array circuitry having processing engines each with an internal two-stage pipeline depth in accordance with an embodiment.

In accordance with an embodiment, systolic array circuitry 104 may include processing elements that each have an internal two-stage pipeline depth (see, e.g., FIG. 6). As shown in FIG. 6, array circuitry 104 may include multiple processing engines PE coupled in series in a chain to form a 1D or linear systolic array. In the example of FIG. 6, only four processing engines PE0-PE3 are shown, but the techniques described herein may be extended to a systolic array with any number of processing engines.

A first sequence Seq1 may be received from a first sequence memory (see memory 106-1 in FIG. 1) via parallel data paths 404. A second sequence Seq2 may be received from a second sequence memory (see memory 106-2 in FIG. 1) via serial data path 402. The processing engines may output backtracking data to an output memory (see memory 108 in FIG. 1) via path 406. The score from processing engine PE3 may be selectively fed back as an input to processing engine PE0 via feedback path 408. A loopback memory 410 and multiplexing circuit 412 may be interposed in feedback path 408. In particular, multiplexer 412 may have a first(0) input that receives the score from path 408 (effectively bypassing loopback memory 410) via pipeline element 603 (e.g., a register, a digital flip-flop, or other clocked storage element), a second(1) input that directly receives a buffered score from loopback memory 410, and an output that is coupled to the input of processing engine PE0. To compare the symbols between Seq1 and Seq2, the symbols of Seq2 are fed serially while the symbols of Seq1 are applied in parallel to the processing engines.

As shown in FIG. 6, each processing engine includes two internal pipeline elements 602. Pipeline elements 602 may be registers, digital flip-flops, or other clocked storage elements (as examples). In the case of two-deep pipelining, the input vectors of the sequence pair may be segmented into "even" and "odd" parts. The even parts may be computed during even clock cycles, whereas the odd parts may be computed during odd clock cycles. In other words, the even and odd parts may be computed in parallel on alternating cycle clocks. The internal pipelines of each processing engine, additional pipeline element 603, and loopback memory 410 takes care of the cycle-based data dependencies. Cell computation results are written to loopback memory 410 whenever there are data dependencies between cells computed in different iterations. The read addresses to the sequence memories are generated appropriately while keeping in mind the data dependencies of the compute cycle. In contrast, loopback memory 410 may be a first-in first-out (FIFO) circuit that is selectively activated using read and write enable signals.

Figure 7:
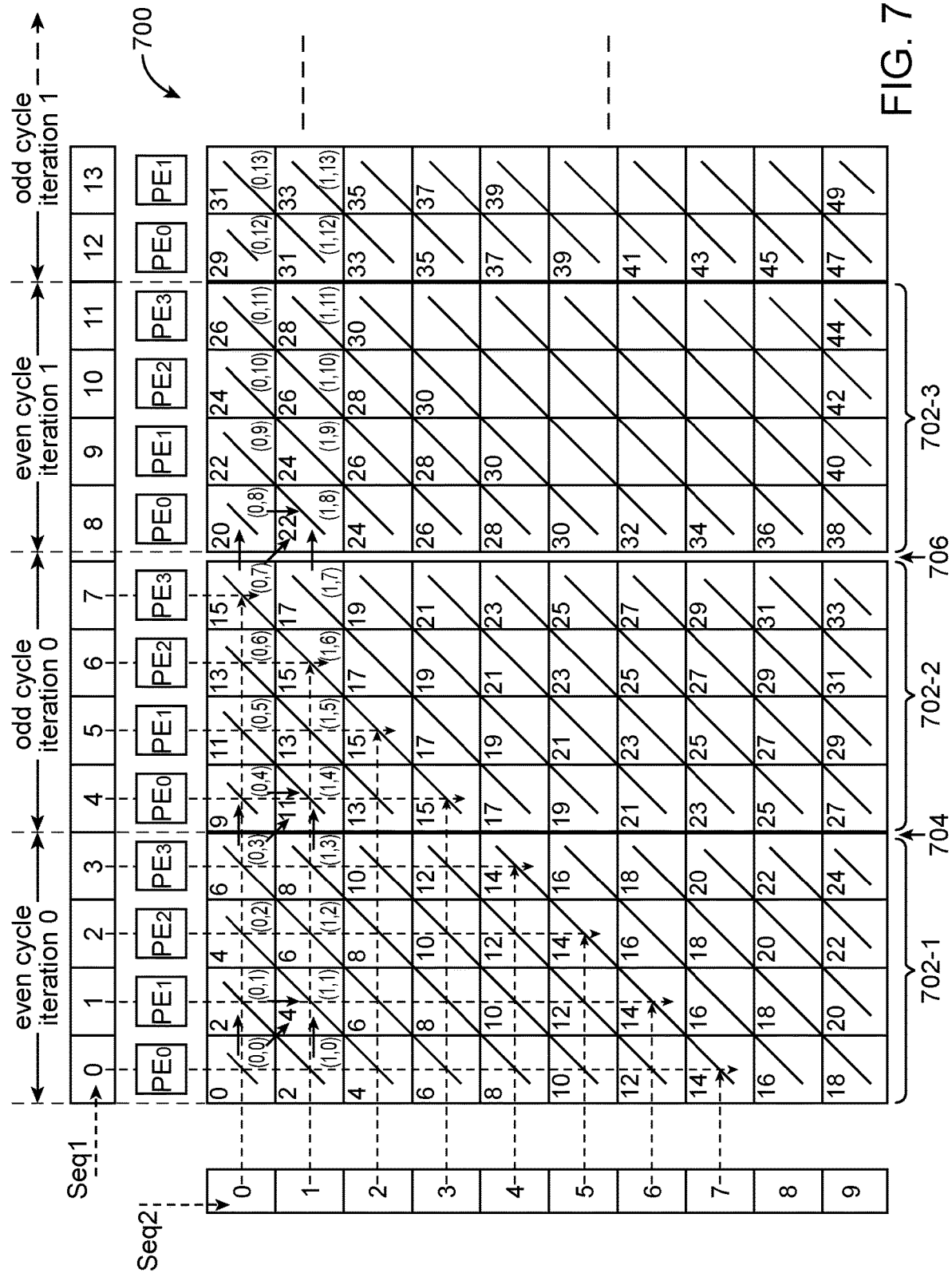
FIG. 7 is a diagram of an illustrative substitution matrix that can be created using systolic array circuitry of the type shown in FIG. 6 in accordance with an embodiment.
Figure 8:
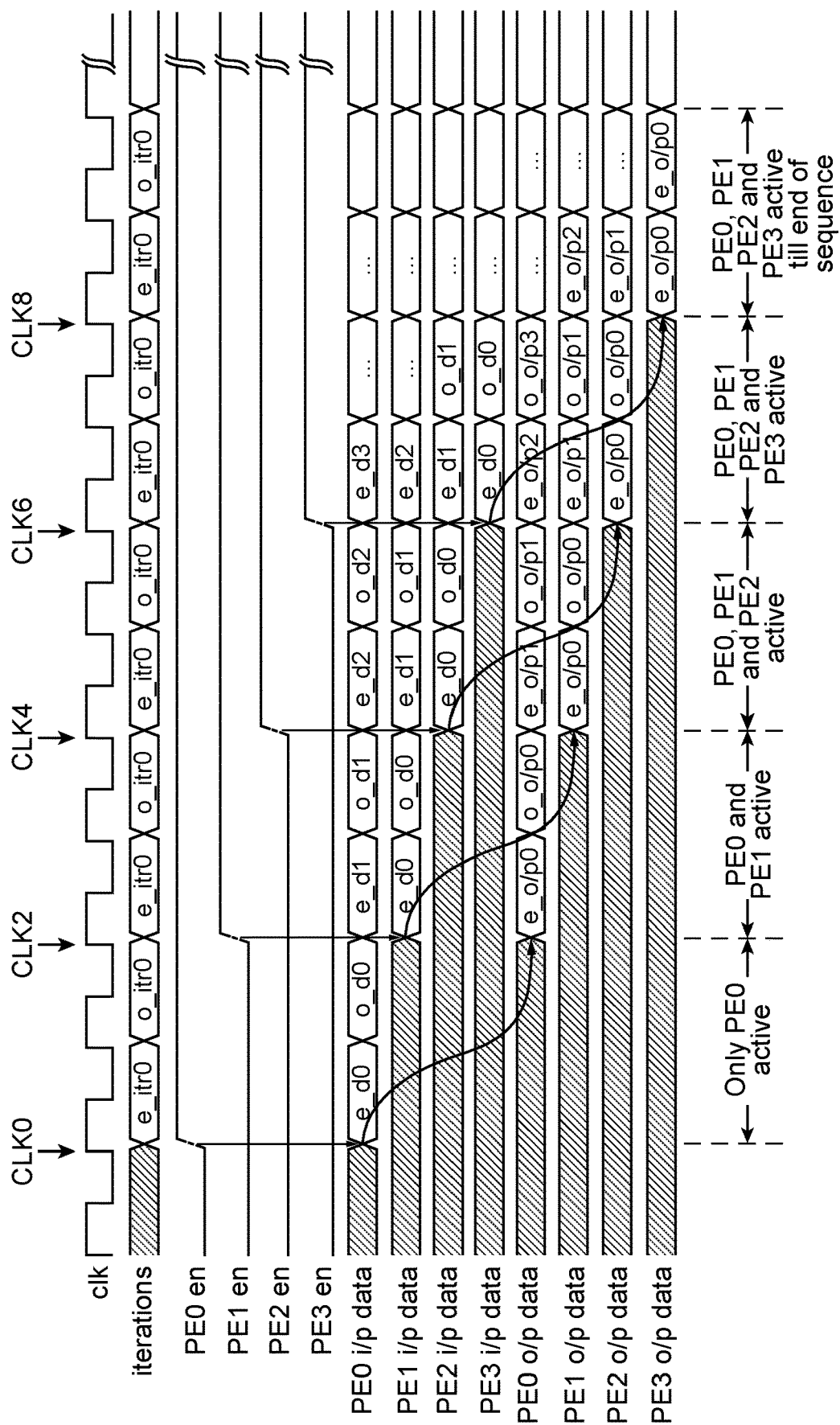
FIG. 8 is a timing diagram illustrating the operation of systolic array circuitry of the type shown in FIG. 6 in accordance with an embodiment.

The operation of pipelined systolic array 104 of FIG. 6 is illustrated in FIGS. 7-9. FIG. 7 is a diagram of an illustrative substitution matrix 700 that can be created using systolic array circuitry 104 of the type shown in FIG. 6. The number at the top left corner of each cell of matrix 700 represents the clock cycle in which that particular cell is computed. The number at the bottom right corner of each cell of matrix 700 represents the cell index/position. As described above, for an internal pipeline depth of two, the substitution matrix computation can be divided into 2 parts: an even cycle portion and an odd cycle portion.

As shown in FIG. 7, the symbols at indices 0, 1, 2, and 3 of Seq1 belong to the even part of iteration-0, whereas the symbols at indices 4, 5, 6, and 7 of Seq1 belong to the odd part of iteration-1. Cell values for symbols at indices 0-3 of Seq1 that are computed in the even cycles of iteration-0 may belong to a first matrix slice 702-1. Similarly, cell values for symbols at indices 4-7 of Seq1 that are computed in the odd cycles of iteration-0 may belong to a second matrix slice 702-2. The length of each slice 702 may be proportional to the number of processing engines in the systolic array, which is equal to four in this example. The boundary between slices 702-1 and 702-2 may sometimes be referred to as a slice boundary 704.

During cycles 0-8, the processing engines are only active on the even cycles (e.g., on clock cycles 0, 2, 4, and 8) and are idle on the odd cycles (e.g., on clock cycles 1, 3, 5, and 7). Similar to FIG. 5, cell values in slice 702-1 of substitution matrix 700 may be computed in a diagonal fashion. As shown in FIG. 7, cells along a diagonal associated with even cycles have data dependencies only on cells from the previous even diagonal. Hence, even and odd cycles can generally operate independently. There may be a data dependency between the even and odd iteration only at slice boundary 704 and at iteration boundary 706.

The processing engines will begin to be active on the odd cycles once their data dependences from the even cycles are resolved. For example, cell(0,4) has a data dependency on cell(0,3), so only after cell(0,3) has been computed in the 6th even clock cycle can cell(0,4) be computed in the 9th cycle, which is the next odd cycle plus the pipeline delay. Data dependency across a slice boundary (sometimes referred to as a first type of data dependency) 704 may be handled by routing the score from PE3 back to PE0 while bypassing loopback memory 410 (e.g., by configured multiplexer 412 of FIG. 6 to select first its "0" input).

Remaining cell values in slice 702-2 can then be populated in subsequent odd cycles. Cell values in slice 702-2 of substitution matrix 700 may also be computed in a diagonal fashion. Beyond this, the even and the odd cycles operate independently and in parallel, as the internal pipeline structure of each processing engine automatically handles the data dependencies from one cycle to the next. Moreover, each processing engine may receive relevant even and odd input data (e.g., by appropriate addressing input sequence memories 106-1 and 106-2 in FIG. 1). The outputs of each processing engine in even and odd cycles may be stored in separate even and odd output memory banks within output memory 108 (e.g., substitution matrix scores for slices/segments 702-1 and 702-2 associated with iteration-0 may be computed in parallel in alternating even and odd cycles).

Loopback memory 410 may be accessed when required to resolve the required data dependencies across iteration boundary 706 (e.g., when crossing from odd cycles of iteration-0 to even cycles of interation-1). In other words, data dependency across iteration boundary 706 (sometimes referred to as a second type of data dependency) may be handled by accessing loopback memory 410 (e.g., by configured multiplexer 412 of FIG. 6 to select first its "1" input). For example, cell(0,8) has a data dependency on cell(0,7), which is calculated in the 15th clock cycle. As shown in FIG. 7, processing engine PE0 is responsible for computing the cell value for cell(0,8), but PE0 is only free after the 18th cycle, after it computes cell(9,0). Thus, cell(0,8) is calculated in the next even cycle, which is the 20th clock cycle.

In order to resolve the data dependency across iteration boundary 706, the result of cell(0,7) is stored in loopback memory 410 and is read out in the 20th clock cycle. Similarly, cell(1,8) has data dependency on cell(0,7), cell(1, 7), and cell(0,8). In this case, since cell(0,8) and cell(1,8) are both computed by PE0, the internal pipeline within PE0 takes care of this dependency while loopback memory 410 is used to resolve the dependencies on the results from cell(0,7) and cell(1,7). The matrix entries of iteration-1 may be computed in the way similar to iteration-0. This scheme for computing substitution matrix 700 is therefore sometimes referred to as iteration-based interleaving.

FIG. 8 illustrates the latency of the processing engines with an internal pipeline depth of two. The initial latency of each processing engine is equal to the internal pipeline depth (e.g., two). Signals "PE<x> en" indicate when each processing engine is enabled. Signals "PE<x> i/p data" indicate when input data is received at each processing engine. Signals "PE<x> o/p data" indicate when output data is generated at each processing engine. As shown in FIG. 8, only PE0 may be active at clock cycle 0, only PE0 and PE1 are active at clock cycle 2, only PE0-PE2 are active at clock cycle 4, but starting at clock cycle 6, PE0-PE3 will all be active until the end of the sequence comparison. Note that although the odd cycles are shown in FIG. 8, the processing engines may be idle during the odd cycles until later clock cycles, as described above in connection with FIG. 7 (e.g., the first odd clock cycle that PE0 becomes active is the 9th cycle).

FIG. 9 is a table illustrating how substitution matrix 700 of FIG. 7 can be filled over time (assuming a latency of two clock cycles). Initially, all processing engines are only active on even cycles of iteration-0. As shown in FIG. 9, processing engine PE0 starts computing R0C0 (i.e., Row 0 and Column 0) at clock cycle 0. At cycle 2, processing engines PE0 and PE1 compute R1C0 and R0C1, respectively. At cycle 4, PE0-PE2 compute R2C0, R1C1, and R0C2, respectively. The data dependency of R1C1 is shown by the three arrows in FIG. 9. Starting from cycle 6, PE0-PE3 will continue to stay active on all even clock cycles until the end of Seq1.

Later, the processing engines will start interleaving odd cycles of iteration-0 starting at clock cycle 9. At cycle 9, PE0 will compute R0C4. At cycle 11, processing engines PE0 and PE1 compute R1C4 and R005. At cycle 13, PE0-PE2 compute R2C4, R1C5, and R0C6, respectively. Starting from cycle 15, PE0-PE3 will continue to stay active on all odd clock cycles until the end of Seq1.

When the length of Seq1 is greater than eight, the loopback memory will be accessed to resolve memory dependencies across the iteration boundary between iteration-0 and iteration-1. Thus, the processing engines will start interleaving the even cycles of iteration-1 starting at clock cycle 20 to process R0C8. At cycle 20, PE0 computes R0C8 for iteration-1 while PE1-PE3 compute R9C1, R8C2, and R7C3 (respectively) for iteration-0. At cycle 22, PE0 and PE1 computes R1C8 and R0C5 (respectively) for iteration-1 while PE2 and PE3 compute R9C2 and R8C3 (respectively) for iteration-0. The processing engines will stay active to processing all iterations until the end of Seq1.

The examples of FIGS. 4-9 in which systolic array circuitry 104 includes four processing engines are merely illustrative and are not intended to limit the scope of the present embodiments. In general, systolic array circuitry 104 may be extended to include any number of serially-coupled processing engines (e.g., at least two processing engines, four or more processing engines, six or more processing engines, eight or more processing engines, etc.). Moreover, each processing engine in circuitry 104 may generally have any internal pipeline depth of n (e.g., n may be greater than or equal to 2, at least 4, at least 6, at least 8, any power of two, etc.).

Configured in this way, systolic array circuitry 104 may be n times more efficient relative to schemes without any internal pipelining. By using an internal pipeline depth of n, an n times reduction in memory (since the internal pipelining automatically handles the data dependencies from one cycle to the next) and an n times reduction in compute latency (since different chunks of a single input sequence operate in parallel) can also be realized. The arrangement of the processing engines to compute matrix cell values in a diagonal manner and the data movement across slice and iteration boundaries improve the performance and efficiency of iteration-based interleaving without introducing any bubbles (i.e., no operations) and provides optimal utilization of the compute resources.

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs), microcontrollers, microprocessors, central processing units (CPUs), graphics processing units (GPUs), etc. Examples of programmable logic devices include programmable arrays logic (PALs), programmable logic arrays (PLAs), field programmable logic arrays (FPLAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

EXAMPLES

The following examples pertain to further embodiments.

Example 1 is an integrated circuit, comprising: a first memory circuit that stores a first sequence; a second memory circuit that stores a second sequence; and systolic array circuitry that receives the first sequence from the first memory circuit and the second sequence from the second memory circuit and that aligns the second sequence to the first sequence by computing a substitution matrix, dividing the substitution matrix into multiple slices, and computing scores for the multiple slices in parallel.

Example 2 is the integrated circuit of example 1, wherein systolic array circuitry optionally computes the scores for the multiple slices in alternating even and odd clock cycles.

Example 3 is the integrated circuit of example 1, wherein systolic array circuitry optionally computes the scores for each of the multiple slices in a diagonal manner across the substitution matrix.

Example 4 is the integrated circuit of example 1, wherein the systolic array circuitry optionally receives the first sequence from the first memory circuit via parallel data paths.

Example 5 is the integrated circuit of example 1, wherein the systolic array circuitry optionally receives the second sequence from the second memory circuit via a serial data path.

Example 6 is the integrated circuit of any one of examples 1 and 3-5, wherein the systolic array circuitry optionally comprises a plurality of processing engines coupled in series, wherein the plurality of processing engines processes a first of the multiple slices in even clock cycles and processes a second of the multiple slices in odd clock cycles.

Example 7 is the integrated circuit of example 6, wherein the plurality of processing engines optionally comprise comparison circuits for implementing either the Smith-Waterman algorithm or the Needleman-Wunsch algorithm.

Example 8 is the integrated circuit of example 6, wherein a processing engine in the plurality of processing engines optionally includes at least two internal pipeline elements, and wherein the at least two internal pipeline elements are configured to to buffer data to resolve a first type of data dependency between the multiple slices.

Example 9 is the integrated circuit of example 8, wherein the systolic array circuitry optionally further comprises a loopback memory coupled between an output of the plurality of processing engines and an input of the plurality of processing engines, wherein the loopback memory is configured to buffer data to resolve a second type of data dependency between the multiple slices, and wherein the second type of data dependency is different than the first type of data dependency.

Example 10 is the integrated circuit of example 9, wherein the systolic array circuitry optionally further comprises a multiplexing circuit coupled between the loopback memory and the input of the plurality of processing engines.

Example 11 is a method of operating an integrated circuit, comprising: with a first memory circuit, storing a first sequence; with a second memory circuit, storing a second sequence; and with systolic array circuitry, receiving the first and second sequences and aligning the first and second sequences by computing a substitution matrix, dividing the substitution matrix into multiple segments, and computing scores for the multiple segments in parallel.

Example 12 is the method of example 11, wherein computing the scores for the multiple segments in parallel optionally comprises computing the scores for the multiple segments in alternating clock cycles.

Example 13 is the method of example 11, wherein the systolic array circuit optionally receives the first sequence from the first memory circuit via a parallel data path and receives the second sequence from the second memory circuit via a serial data path.

Example 14 is the method of any one of examples 11-13, optionally further comprising: with a loopback memory circuit, buffering data to resolve data dependencies across an iteration boundary in the substitution matrix.

Example 15 is the method of example 14, optionally further comprising: with a multiplexing circuit, selectively bypassing the loopback memory circuit to resolve data dependencies across a slice boundary in the substitution matrix.

Example 16 is an integrated circuit, comprising: a first memory storing a first sequence; a second memory storing a second sequence; and a systolic array that aligns the first and second sequences, wherein the systolic array comprises: a first processing engine having an input; a second processing engine having an output; and a multiplexer that selectively feeds data from the output of the second processing engine to the input of the first processing engine.

Example 17 is the integrated circuit of example 16, wherein the first processing engine optionally has an internal pipeline depth of at least two.

Example 18 is the integrated circuit of example 16, wherein the systolic array optionally further comprises at least one additional processing engine interposed between the first and second processing engines, and wherein the processing engines in the systolic array are configured to implement a dynamic programming sequence alignment algorithm.

Example 19 is the integrated circuit of any one of examples 16-18, wherein the systolic array optionally further comprises a loopback memory interposed between the multiplexer and the output of the second processing engine.

Example 20 is the integrated circuit of 19, wherein the systolic array optionally aligns the first and second sequences by computing a substitution matrix, and wherein the multiplexer is optionally configured in a first mode to resolve data dependencies across a slice boundary of the substitution matrix and is further configured in a second mode to resolve data dependencies across an iteration boundary of the substitution matrix.

Example 21 is an integrated circuit, comprising: first means for storing a first sequence; second means for storing a second sequence; and means for receiving the first and second sequences and aligning the first and second sequences by computing a substitution matrix, dividing the substitution matrix into multiple segments, and computing scores for the multiple segments in parallel.

Example 22 is the integrated circuit of example 21, wherein the means for computing the scores for the multiple segments in parallel optionally comprises means for computing the scores for the multiple segments in alternating clock cycles.

Example 23 is the integrated circuit of example 21, wherein the means for receiving the first and second sequences optionally receives the first sequence from the first means via a parallel data path and receives the second sequence from the second means via a serial data path.

Example 24 is the integrated circuit of any one of examples 21-23, optionally further comprising: means for buffering data to resolve data dependencies across an iteration boundary in the substitution matrix.

Example 25 is the integrated circuit of example 24, optionally further comprising: means for selectively bypassing the loopback memory circuit to resolve data dependencies across a slice boundary in the substitution matrix.

For instance, all optional features of the apparatus described above may also be implemented with respect to the method or process described herein. The foregoing is merely illustrative of the principles of this disclosure and various modifications can be made by those skilled in the art. The foregoing embodiments may be implemented individually or in any combination.

What is claimed is:

1. An integrated circuit, comprising:
a first memory circuit that stores a first sequence;
a second memory circuit that stores a second sequence; and
systolic array circuitry that receives the first sequence from the first memory circuit and the second sequence from the second memory circuit and that aligns the second sequence to the first sequence by computing a substitution matrix, dividing the substitution matrix into multiple slices, and computing scores for the multiple slices in parallel.

2. The integrated circuit of claim 1, wherein systolic array circuitry computes the scores for the multiple slices in alternating even and odd clock cycles.

3. The integrated circuit of claim 1, wherein systolic array circuitry computes the scores for each of the multiple slices in a diagonal manner across the substitution matrix.

4. The integrated circuit of claim 1, wherein the systolic array circuitry receives the first sequence from the first memory circuit via parallel data paths.

5. The integrated circuit of claim 1, wherein the systolic array circuitry receives the second sequence from the second memory circuit via a serial data path.

6. The integrated circuit of claim 1, wherein the systolic array circuitry comprises a plurality of processing engines coupled in series, wherein the plurality of processing engines processes a first of the multiple slices in even clock cycles and processes a second of the multiple slices in odd clock cycles.

7. The integrated circuit of claim 6, wherein the plurality of processing engines comprise comparison circuits for implementing either the Smith-Waterman algorithm or the Needleman-Wunsch algorithm.

8. The integrated circuit of claim 6, wherein a processing engine in the plurality of processing engines includes at least two internal pipeline elements, and wherein the at least two internal pipeline elements are configured to to buffer data to resolve a first type of data dependency between the multiple slices.

9. The integrated circuit of claim 8, wherein the systolic array circuitry further comprises a loopback memory coupled between an output of the plurality of processing engines and an input of the plurality of processing engines, wherein the loopback memory is configured to buffer data to resolve a second type of data dependency between the multiple slices, and wherein the second type of data dependency is different than the first type of data dependency.

10. The integrated circuit of claim 9, wherein the systolic array circuitry further comprises a multiplexing circuit coupled between the loopback memory and the input of the plurality of processing engines.

11. A method of operating an integrated circuit, comprising:
with a first memory circuit, storing a first sequence;
with a second memory circuit, storing a second sequence; and
with systolic array circuitry, receiving the first and second sequences and aligning the first and second sequences by computing a substitution matrix, dividing the substitution matrix into multiple segments, and computing scores for the multiple segments in parallel.

12. The method of claim 11, wherein computing the scores for the multiple segments in parallel comprises computing the scores for the multiple segments in alternating clock cycles.

13. The method of claim 11, wherein the systolic array circuit receives the first sequence from the first memory circuit via a parallel data path and receives the second sequence from the second memory circuit via a serial data path.

14. The method of claim 11, further comprising:
with a loopback memory circuit, buffering data to resolve data dependencies across an iteration boundary in the substitution matrix.

15. The method of claim 14, further comprising:
with a multiplexing circuit, selectively bypassing the loopback memory circuit to resolve data dependencies across a slice boundary in the substitution matrix.

16. An integrated circuit, comprising:
a first memory storing a first sequence;
a second memory storing a second sequence; and
a systolic array that aligns the first and second sequences, wherein the systolic array comprises:
a first processing engine having an input;
a second processing engine having an output; and
a multiplexer that selectively feeds data from the output of the second processing engine to the input of the first processing engine.

17. The integrated circuit of claim 16, wherein the first processing engine has an internal pipeline depth of at least two.

18. The integrated circuit of claim 16, wherein the systolic array further comprises at least one additional processing engine interposed between the first and second processing engines, and wherein the processing engines in the systolic array are configured to implement a dynamic programming sequence alignment algorithm.

19. The integrated circuit of claim 16, wherein the systolic array further comprises a loopback memory interposed between the multiplexer and the output of the second processing engine.

20. The integrated circuit of claim 19, wherein the systolic array aligns the first and second sequences by computing a substitution matrix, and wherein the multiplexer is configured in a first mode to resolve data dependencies across a slice boundary of the substitution matrix and is further configured in a second mode to resolve data dependencies across an iteration boundary of the substitution matrix.

* * * * *